(12) United States Patent
Pani et al.

(10) Patent No.: US 7,466,660 B2
(45) Date of Patent: Dec. 16, 2008

(54) METHOD AND APPARATUS FOR PROCESSING PACKETS ORIGINATING FROM LOCAL AND NEIGHBORING BASIC SERVICE SETS

(75) Inventors: Diana Pani, Montreal (CA); Christopher Cave, Candiac (CA); Angelo Cuffaro, Laval (CA)

(73) Assignee: InterDigital Technology Corporation, Wilmington, DE (US)

( * ) Notice: Subject to any disclaimer, the term of this patent is extended or adjusted under 35 U.S.C. 154(b) by 604 days.

(21) Appl. No.: 11/234,804

(22) Filed: Sep. 23, 2005

(65) Prior Publication Data
US 2006/0182073 A1    Aug. 17, 2006

Related U.S. Application Data

(60) Provisional application No. 60/652,413, filed on Feb. 11, 2005.

(51) Int. Cl.
*H04B 7/00* (2006.01)

(52) U.S. Cl. .................. 370/252; 455/140; 455/181.1; 455/437; 455/67.11; 455/69; 370/338

(58) Field of Classification Search .................. 370/522, 370/270, 252; 455/69, 181.1, 456.5
See application file for complete search history.

(56) References Cited

U.S. PATENT DOCUMENTS

| 6,766,143 | B1 | 7/2004 | Beckwith |
| 6,804,222 | B1 | 10/2004 | Lin et al. |
| 2005/0157676 | A1* | 7/2005 | Kwak et al. ................. 370/328 |

FOREIGN PATENT DOCUMENTS

| TW | 401717 | 8/2000 |
| TW | 453070 | 9/2001 |

* cited by examiner

*Primary Examiner*—Charles N Appiah
*Assistant Examiner*—Randy Peaches
(74) *Attorney, Agent, or Firm*—Volpe and Koenig, P.C.

(57) ABSTRACT

A method and apparatus for efficiently processing packets from neighboring basic service sets (BSSs) to characterize the traffic within a wireless local area network (WLAN), mesh network, or similar wireless communication system is disclosed. The apparatus may be an access point (AP) in a BSS which includes a measurement period (MP) interval timer, a promiscuous measurement period (PMP) timer and a receiver filter. An interval of the MP interval timer is set while the receiver filter is enabled. During the interval, the AP only processes packets which originated from the AP's own BSS. When the MP interval timer expires, a value of the PMP timer is set to a predetermined time duration and the receiver filter is disabled. During the predetermined time duration, the AP processes all received packets irrespective of which BSS the packets originated from. The receiver filter is again enabled when the PMP timer expires.

55 Claims, 4 Drawing Sheets

METHOD AND APPARATUS FOR PROCESSING PACKETS ORIGINATING FROM LOCAL AND NEIGHBORING BASIC SERVICE SETS

CROSS REFERENCE TO RELATED APPLICATION

This application claims the benefit of U.S. Provisional Patent Application No. 60/652,413 filed Feb. 11, 2005, which is incorporated by reference as if fully set forth.

FIELD OF INVENTION

The present invention relates to wireless communication systems. More particularly, the present invention relates to a method and apparatus for setting a promiscuous measurement period (PMP), or other measurement periods (MPs) that coexist with the PMP, (e.g., a silent measurement period (SMP)), for processing packets originating from local and neighboring basic service sets (BSSs).

BACKGROUND

When a wireless local area network (WLAN) is operating in an infrastructure mode or a mesh mode, each of the access points (APs) operating within the BSSs of the WLAN communicate with one or more wireless transmit/receive units (WTRUs), (i.e., wireless stations), associated with the APs. The APs and the associated WTRUs communicate with each other by sending and receiving packets over a given channel. In typical deployments in the un-licensed spectrum, there may be one or more APs operating on the same channel. In such cases, it may be necessary to adjust both power and frequency settings to improve the system performance by reducing interference and the number of deferrals.

One metric used to aid in adjusting the power level and frequency setting is the level of activity on the given channel. To determine the level of activity on the given channel, it is advantageous for the APs to process all of the packets received on the same channel from the neighboring BSSs.

SUMMARY

The present invention is related to a method and apparatus for efficiently processing packets which originate from neighboring BSSs and estimating the characteristics of traffic between all nodes within a WLAN, mesh network or similar wireless communication system without impacting or disrupting the currently served traffic of the measuring node.

Typically, each of the APs has a receiver filter used to block unnecessary data and to pass only necessary data to a medium access control (MAC) layer according to the requirements of the AP. In order to limit the processing requirements, in normal operation, the AP sets the receiver filter such that only the packets destined to the AP are forwarded to the MAC layer of the AP and other unnecessary packets are blocked by the receiver filter without being further processed. However, to determine the level of activity on the given channel, it is necessary to receive and process all packets from neighboring BSSs, (out-of-BSS packets). The out-of-BSS packet information includes header information and a received signal strength indication (RSSI) as a primary measurement required, or the like.

The receiver filter of the AP can be set such that all of the received packets are forwarded to the MAC layer of the AP. This mode of operation is called a promiscuous mode and allows the AP to process all of the out-of-BSS packets and retrieve the necessary information from the out-of-BSS packets transmitted from neighboring BSSs.

However, when the AP continuously operates in the promiscuous mode, the performance of the AP is degraded due to the extra load that is imposed on the processor in the AP when receiving and processing all of the packets. In addition, when the AP operates in the promiscuous mode, new WTRUs are restricted from associating with the AP if the load exceeds an established threshold.

In order to minimize the degradation on the AP and to characterize the traffic, operation in promiscuous mode is limited to very finite and regular durations. The samples of collected statistics are averaged over a longer interval to fully and reliably characterize the traffic.

The apparatus may be an AP in a BSS which includes a measurement period (MP) interval timer, a PMP timer and a receiver filter. An interval of the MP interval timer is set while the receiver filter is enabled. During the interval, the AP is restricted to processing only packets which originated from the AP's own BSS. When the MP interval timer expires, a value of the PMP timer is set to a predetermined time duration and the receiver filter is disabled. During the predetermined time duration, the AP processes all received packets irrespective of which BSS the packets originated from. The receiver filter is again enabled when the PMP timer expires.

The PMP may be provided along with other types of measurement period, such as an SMP. When the MP interval timer expires, either a PMP or an SMP is provided. During the PMP, the AP processes data packets on the same channel while, during the SMP, the AP processes data packets on all of the channels in an active channel set (ACS).

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

Hereafter, the terminology "WTRU" includes but is not limited to a wireless station (STA), a user equipment (UE), a mobile station, a fixed or mobile subscriber unit, a pager, or any other type of device capable of operating in a wireless environment. When referred to hereafter, the terminology "AP" includes but is not limited to a Node-B, a base station, a site controller or any other type of interfacing device in a wireless environment.

The features of the present invention may be incorporated into an integrated circuit (IC) or be configured in a circuit comprising a multitude of interconnecting components.

Figure 1:
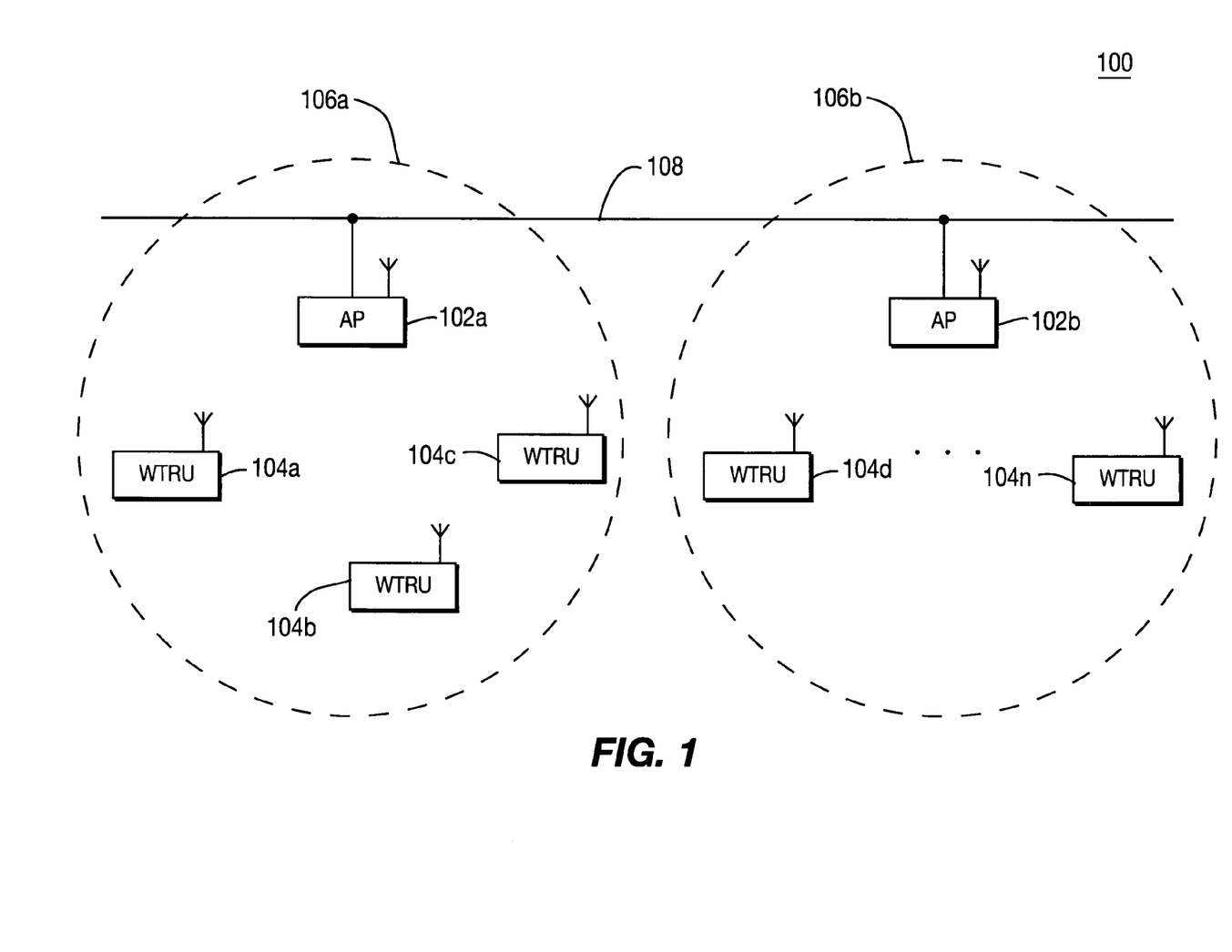
FIG. 1 shows a wireless communication system including a plurality of BSSs having APs and WTRUs which operate in accordance with the present invention.

The invention provides a means to monitor and estimate the characteristics of traffic between all nodes within a WLAN or MESH or similar wireless system without impacting or disrupting the currently served traffic of the measuring node FIG. 1 shows a wireless communication system 100 including a local BSS 106a and at least one neighboring BSS 106b which are connected by a distribution system 108. The present invention is applicable to an infrastructure network, as shown in FIG. 1, or a mesh network (not shown). The local BSS 106a includes an AP 102a and one or more WTRUs 104a, 104b, 104c. The at least one neighboring BSS 106b includes an AP 102b and one or more WTRUs 104d-104n. The BSSs 106a, 106b and the distribution system 108 are comprised by an extended service set (ESS), (not shown).

Each AP 102 has a receiver filter used to block unnecessary data and to pass only necessary data to a medium access control (MAC) layer according to the requirements of the AP 102. In order to limit the processing requirements, in normal operation, the AP 102 sets the receiver filter such that only the packets destined to the AP 102 are forwarded to the MAC layer of the AP 102 and other unnecessary packets are blocked by the receiver filter without being further processed.

However, to determine the level of activity on the given channel, it is necessary to receive and process packets from neighboring BSSs 106b, (i.e., out-of-BSS packets). The out-of-BSS packet information includes header information and a received signal strength indication (RSSI) as a primary measurement required, or the like.

The receiver filter of the AP 102a can be set such that all of the received packets are forwarded to the MAC layer of the AP 102a. This mode of operation is called a promiscuous mode and allows the AP 102a to process all of the out-of-BSS packets and retrieve the necessary information from the out-of-BSS packets transmitted from neighboring BSSs 106b.

When in a default operating mode whereby a receiver filter in the AP 102a is enabled, the AP 102a processes only received data packets which originated from its own BSS 106a. When in a promiscuous mode whereby the receiver filter in the AP 102a is disabled, the AP 102a processes all received data packets which originated from both the BSS 106a and the at least one neighboring BSS 106b.

The AP 102a sets the value of an MP. Between two consecutive MPs is an interval, $T_{MP}$. During the interval, $T_{MP}$, the AP 102a is in the default operating mode whereby only the data packets originating from its own BSS 106a, (i.e., in-BSS packets), are processed. When the interval, $T_{MP}$, expires, either a PMP or an SMP is triggered during which the AP 102a is in the promiscuous mode.

In a normal phase of the AP 102a, the MPs alternate between the PMPs and the SMPs based on a periodicity constant, ($P_{SMP}$). Every $P_{SMP}$-th MP corresponds to an SMP. For example, if the $P_{SMP}$ is 2, then every other MP corresponds to an SMP. Therefore, the first MP is a PMP, the second MP is an SMP, the third MP is a PMP, the fourth MP is an SMP, and so on. During a discovery phase of the AP 102a, the periodicity constant is set to 1. Therefore, every MP is provided as an SMP.

During the PMP, the AP 102a performs measurements and collects packet information on out-of-BSS packets received on the same channel as in-BSS packets. This allows the AP 102a to perform measurements and collect packet information on out-of-BSS packets received by the AP 102a on the same channel that in-BSS packets are received.

The obtained measurements and information are averaged over a longer period of time such that the information becomes sufficient to understand the main characteristics of the channel. When the PMP expires, the AP 102a returns to its default operating mode; thereby reducing the processing load of the AP 102a.

The PMP is set to a short period of time. Even though the AP 102a is fully functional during the PMP, since the PMP will only consume a small portion of the operating time, the performance of the AP 102a remains substantially unaffected.

The SMP is an MP where the AP 102a halts traffic within it own BSS 106a to gather information about other channels. Similar to the PMP, the SMP is performed twice a second for a very short time period (5 ms), during which the AP 102a stops transmitting on the current channel, switches to at least one other channel contained in the ACS, and listens to the at least one other channel while processing all of the packets received on the other channel to determine activity level of that channel. The AP 102a also performs interference measurements on the other channel. Then the AP 102a switches back to its normal channel and continues serving its WTRUs 104a, 104b, 104c.

In the PMP case, the AP 102a never switches channels. Instead, the AP 102a disables its receiver filter such the AP 102a can receive packets that are not destined for the AP 102a, (i.e., the AP 102a eavesdrops on the conversations of other APs and/or WTRUs in at least one neighboring BSS 106b). During this time, the AP 102a continues to serve the WTRUs 104a, 104b, 104c in the BSS 106a. Thus, there is no service interruption at all, unlike the SMP where there is a service interruption during each time period it is performed since the AP 102a stops transmitting when it switches channels.

Since SMPs may cycle through several channels (e.g., channels 1, 6 and 11), relying on SMPs only may be insufficient to determine information related to neighboring nodes that are operating on the current channel. Some algorithms require a more accurate determination of the load of neighboring nodes that are operating on the same channel.

The operation of SMP is disclosed in detail in copending U.S. patent application Ser. No. 11/009,821 entitled "wireless communication method and apparatus for managing radio resources using silent measurement periods" by Paul Marinier et al., which is incorporated by reference as if fully set forth herein.

Figure 2:
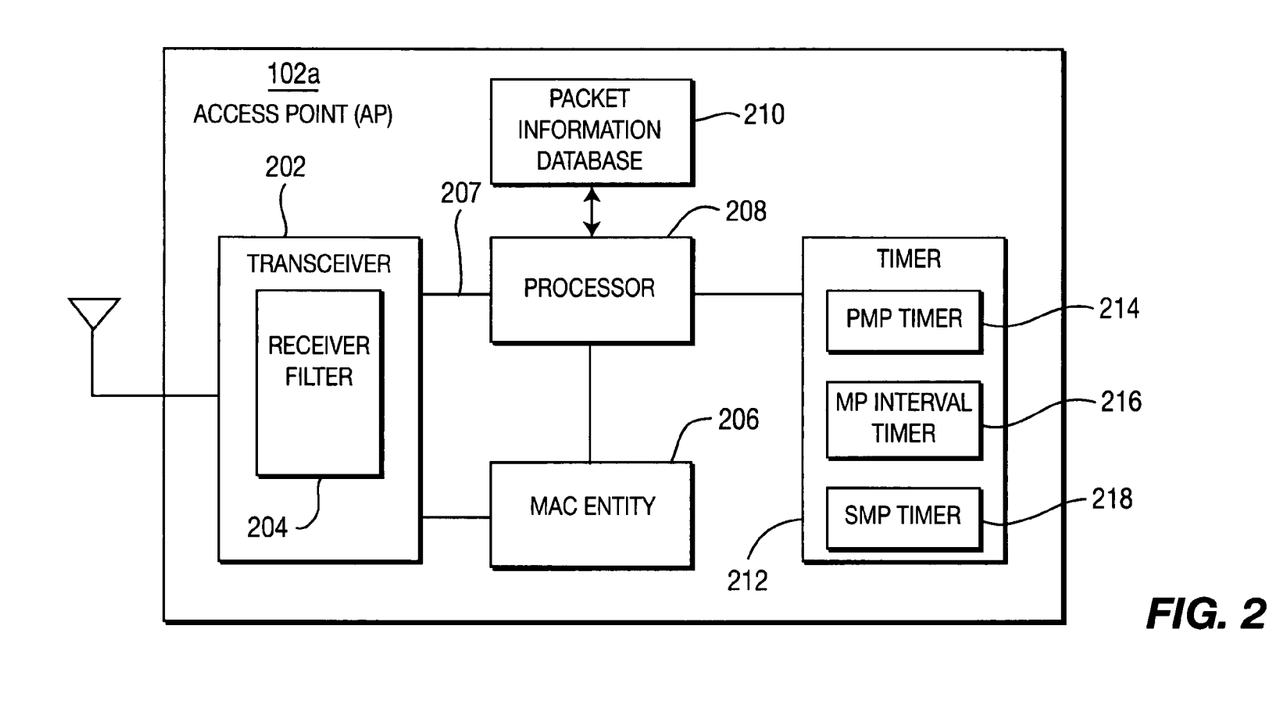
FIG. 2 is an exemplary block diagram of an AP of a local BSS in the wireless communication system of FIG. 1.

FIG. 2 is an exemplary block diagram of the AP 102a of the local BSS 106a of the wireless communication system of FIG. 1. The AP 102a includes a transceiver 202 with a receiver filter 204, a MAC entity 206, a processor 208, a packet information database 210 and a timer 112. The transceiver 202 may be configured as a physical layer entity for receiving and transmitting packets. The received packets are forwarded to the MAC entity 206 for MAC layer processing. The processor 208 controls the transceiver 202 such that either the AP 102a enters a default operating mode whereby the receiver filter 204 is enabled, (i.e., turned on or inserted into a path through which packets received by the AP 102a are routed), such that only the packets originating from the BSS 106a of the AP 102a are forwarded to the MAC entity 206, or the AP 102a enters a promiscuous mode whereby the receiver filter is disabled, (i.e., turned off or bypassed), such that all of the packets received on the channel from the BSS 106a and the at least one neighboring BSS 106b are forwarded to the MAC entity 206.

The processor 208 selects between the default operating mode and the promiscuous mode in accordance with the timer 212. The timer 212 includes a PMP timer 214, an MP interval timer 216 and an SMP timer 218. The processor 208 computes and sets up an interval, $T_{MP}$, for the MP interval timer 216 based on a fixed component, ($T_{MP\_fix}$), and a variable component, ($T_{MP\_var}$).

For example, the fixed component may be set to 250 ms during normal operation and 1,000 ms during a discovery phase, and the variable component may be set to ±20 ms during normal operation and 0 ms during discovery phase.

The fixed component is used as the main periodic timing mechanism for triggering a PMP or SMP. Thus, the fixed component determines the periodicity at which MPs occur.

The variable component is used to make sure that all of the APs 102a, 102b are not synchronized when performing the SMPs or PMPs, as it is not desired to measure activity on a given channel at the same time that another AP 102 under study is also performing an SMP on another channel, (i.e., an empty channel is being listened to where there is normally traffic on that channel). By introducing this variability, AP synchronization is avoided.

When the MP interval timer 216 expires, the processor 208 sets the value of the PMP timer 214 to a predetermined time duration and sends a control signal to the transceiver 202 via a path 207 to disable the receiver filter 204, (i.e., place the AP 102a in the promiscuous mode), such that all of the packets received on a given channel which originated from both the BSS 106a of the AP 102a and the at least one neighboring BSS 106b are forwarded to the MAC entity 206.

When the PMP timer 214 expires, the processor 208 sends a control signal to the transceiver 202 via the path 207 to enable the receiver filter 204, (i.e., place the AP 102a in the default operating mode), such that only the packets received on the given channel which originated from the BSS 106a are forwarded to the MAC entity 206. The processor 208 then determines whether the next MP should be a PMP or an SMP based on a periodicity constant, as discussed in detail above. Thus, the processor 206 alternates between an SMP and PMP every fixed component period.

If the processor 208 determines that the next MP should be a PMP, the processor 208 sets the value of the PMP timer 214 to a predetermined time duration and sends a control signal to the transceiver 202 via the path 207 to disable the receiver filter 204, (i.e., place the AP 102a in the promiscuous mode), such that all of the packets received on a given channel which originated from both the BSS 106a of the AP 102a and the at least one neighboring BSS 106b are forwarded to the MAC entity 206. When the PMP timer 214 expires, the processor 208 sends a control signal to the transceiver 202 via the path 207 to enable the receiver filter 204, (i.e., place the AP 102a in the default operating mode), such that only the packets received on the given channel which originated from the BSS 106a are forwarded to the MAC entity 206.

If the processor 208 determines that the next MP should be an SMP, the processor 208 sets a value of the SMP timer 218 to a predetermined time period, changes to the next appropriate channel contained in the ACS, and sends a control signal to the transceiver 202 via the path 207 to disable the receiver filter 204, (i.e., place the AP 102a in the promiscuous mode), such that all of the packets received on at least one other channel that the AP 102a switches to which originated from at least one neighboring BSS 106b are forwarded to the MAC entity 206. When the SMP timer 218 expires, the channel is changed to the previous operational channel if required, the processor 208 sends a control signal to the transceiver 202 via the path 207 to enable the receiver filter 204, (i.e., place the AP 102a in the default operating mode), such that only the packets received on the given channel which originated from the BSS 106a are forwarded to the MAC entity 206.

Figure 3:
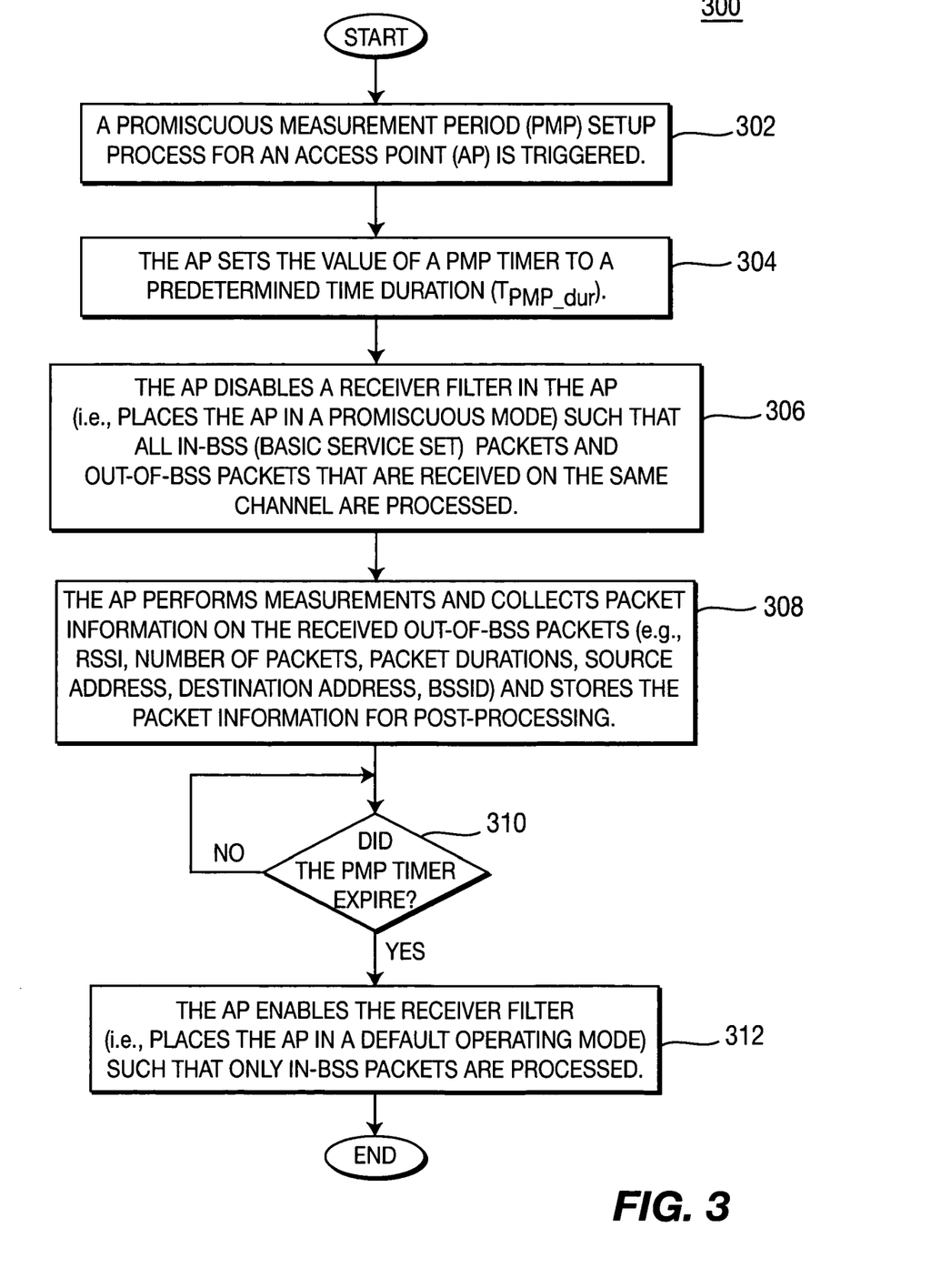
FIG. 3 is a flow diagram of a process for setting up a periodic PMP in accordance with the present invention.

FIG. 3 is a flow diagram of a process 300 including method steps for setting up a PMP for the AP 102a in accordance with the present invention. In step 302, a PMP setup process for the AP 102a is triggered. In step 304, the AP 102a sets the value of the PMP timer 214 to a predetermined time duration, $T_{PMP\_dur}$. The predetermined time duration, $T_{PMP\_dur}$, may be set to any value, (e.g., 10 ms). However, the predetermined time duration, $T_{PMP\_dur}$, should not be too long to substantially disrupt the normal operation of the AP 102a, but should be long enough to allow the reception of a full packet from its neighboring BSS 106b.

As shown in step 306 of FIG. 3, the AP 102a disables a receiver filter in the AP 102a, (i.e., places the AP 102a in a promiscuous mode), such that all packets, (in-BSS and out-of-BSS packets), that are received by the AP 102a on the same channel are processed. In step 308, the AP 102a performs measurements and collects packet information on the received out-of-BSS packets and stores the packet information in the packet information database 210 for post-processing.

The packet information may include the RSSI of packets, the duration of packets and various MAC header fields, such as source address, (MAC address of transmitting node), as well as destination address and BSSID, which specify the BSS to which the AP 102a belongs. The information of packets received during a PMP is stored in the packet information database 210 such that the processor 208 can average measurements collected over a substantial period of time. This average is then used to understand the main characteristics of the channel for post-processing.

For example, the RSSI measurements of received packets, observed over a certain period of time, may be used to determine the proximity of neighboring WLAN nodes, (e.g., determine the radio frequency (RF) path loss to neighboring APs and neighboring WTRUs).

In another example, accumulating the number of packets from individual nodes while considering packet durations may be used to estimate the medium usage from individual nodes and/or from neighboring BSSs that are operating on the same channel.

The processor 208 in the AP 102a continuously monitors the PMP timer 214 while performing the measurements to determine when it expires (step 310). When the PMP timer 214 is determined to have expired in step 310, the AP 102a enables the receiver filter 204, (i.e., places the AP 102a in a default operating mode), such that only in-BSS packets are processed.

Each MP corresponds to either a PMP or an SMP. When in the default operating mode, the AP 102a periodically enters either a PMP or an SMP and receives and processes out-of-BSS packets destined to other APs. During the PMP, the AP 102a listens to only its own channel, but during the SMP, the AP 102a not only listens to its own channel but the AP 102a also listens to all of the available channels in an ACS.

Figure 4:
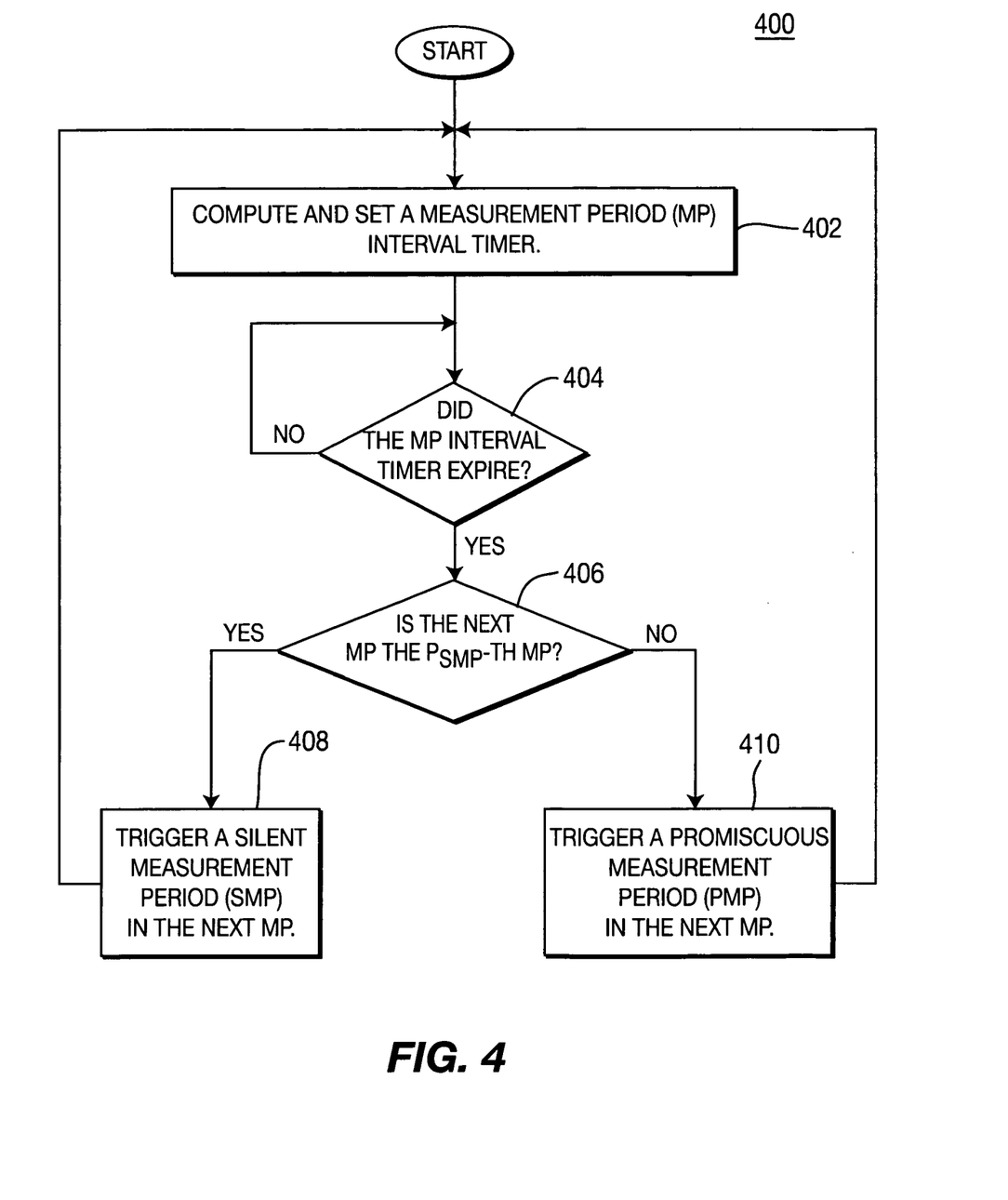
FIG. 4 is a flow diagram of a process for setting up a PMP and an SMP in accordance with the present invention.

FIG. 4 is a flow diagram of a process 400 including method steps for setting up a PMP and an SMP in accordance with the present invention. Upon initiation of the process, the AP 102a computes and sets the value $T_{MP}$ of an MP interval timer (step 402). The AP continuously monitors the MP interval timer 216 to determine when it expires (step 404). When the MP interval timer 216 expires, the AP 102a determines whether an SMP or a PMP should be triggered in the next MP (step 406).

If the next MP is determined in step 406 to be the $P_{SMP}$-th MP, (i.e., a multiple of $P_{SMP}$), an SMP is triggered in the next MP (step 408). When entering the SMP, the SMP timer 218 is set, the channel is changed to next appropriate channel contained in the ACS, and the AP 102a enters the promiscuous mode such that it processes all of the packets received from at least one neighboring BSSs 106b. When the SMP timer 318 expires, the channel is changed back to the previous operational channel, and the process 400 returns to step 302 to set the MP interval timer 216 and the AP 102a enters the default operating mode.

If the next MP is not the $P_{SMP}$-th MP, a PMP is triggered in the next MP (step 410) and the process 300 of FIG. 3 is initiated. Upon expiration of the PMP, the process 400 returns to step 402 to set the MP interval timer 216 and the AP 102a returns to its default operating mode.

Figure 5:
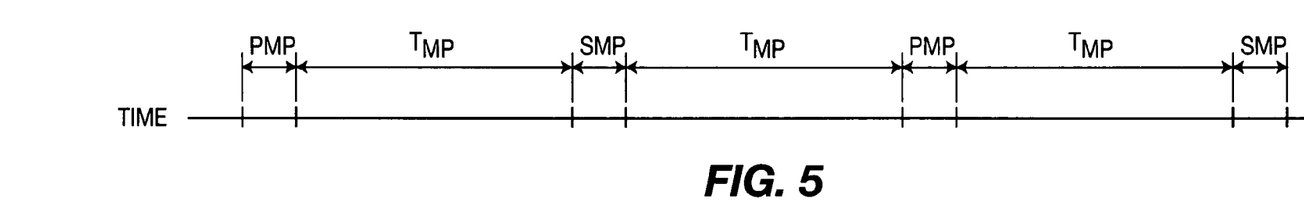
FIG. 5 is a timing diagram for the PMP and the SMP of FIG. 4.

FIG. 5 shows a timing relationship between the PMP and the SMP in the case of $P_{SMP}=2$.

Although the features and elements of the present invention are described in the preferred embodiments in particular combinations, each feature or element can be used alone without the other features and elements of the preferred embodiments or in various combinations with or without other features and elements of the present invention.

What is claimed is:

1. In a wireless communication system including a plurality of basic service sets (BSSs), each BSS being capable of receiving signals from at least one neighboring BSS and including an access point (AP) and at least one wireless transmit/receiver unit (WTRU), the AP including a measurement period (MP) interval timer, a promiscuous measurement period (PMP) timer and a transceiver including a receiver filter, a method for processing data packets received by the AP, the packets originating from the AP's own BSS and the at least one neighboring BSS, the method comprising:
   (a) setting an interval of the MP interval timer while the receiver filter is enabled, wherein the AP is restricted to processing only packets received on a given channel which originate from the AP's own BSS;
   (b) when the MP interval timer expires, setting a value of the PMP timer to a predetermined time duration and disabling the receiver filter for the predetermined time duration, wherein the AP processes packets received on the given channel which originate from the AP's own BSS and the at least one neighboring BSS; and
   (c) enabling the receiver filter when the PMP timer expires.

2. The method of claim 1 wherein the AP further comprises a silent measurement period (SMP) timer, the method further comprising:
   (d) resetting the interval of the MP interval timer when the receiver filter is enabled in step (c);
   (e) determining whether to trigger an SMP or a PMP;
   (f) if a determination is made in step (e) to trigger an SMP:
      (f1) when the MP interval timer expires, setting a value of the SMP timer to a predetermined time period and disabling the receiver filter for the predetermined time period;
      (f2) the AP switching from the given channel to at least one other channel;
      (f3) the AP processing all packets received on the other channel;
      (f4) the AP switching from the other channel to the given channel when the SMP timer expires.

3. The method of claim 1 wherein the interval of the MP interval timer comprises a fixed component and a variable component.

4. The method of claim 2 wherein the result of the determination made in step (e) alternates between triggering the SMP and triggering the PMP based on a periodicity constant.

5. The method of claim 4 wherein if the periodicity constant is 2, then every other MP corresponds to an SMP.

6. The method of claim 4 wherein if the periodicity constant is 2, then every other MP corresponds to a PMP.

7. The method of claim 4 wherein the periodicity constant is set to 1 during a discovery phase of the AP such that every MP is provided as an SMP.

8. The method of claim 1 wherein the AP further comprises a packet information database, and step (b) further comprises:
   (b1) the AP performing measurements and collecting packet information on out-of-BSS packets received on the given channel; and
   (b2) storing the packet information in the packet information database.

9. The method of claim 8 wherein the stored packet information includes a received signal strength indication (RSSI) measurements of the out-of-BSS packets.

10. The method of claim 9 wherein the RSSI measurements are used to determine the proximity of neighboring APs and WTRUs.

11. The method of claim 8 wherein the stored packet information includes a number of packets received from individual nodes and packet durations.

12. The method of claim 11 wherein the number of packets and packet durations are used to estimate the medium usage from neighboring APs and WTRUs operating on the given channel.

13. The method of claim 8 wherein the packet information is collected from medium access control (MAC) header fields of the out-of-BSS packets and stored in a memory.

14. The method of claim 13 wherein the packet information collected from MAC header fields identifies the BSS or WTRU from which the out-of-BSS packets originated from and the time at which the out-of-BSS packets were received.

15. The method of claim 13 wherein the packet information collected from MAC header fields identifies the MAC address of at least one AP.

16. The method of claim 13 wherein the packet information collected from MAC header fields identifies a destination address.

17. The method of claim 2 wherein the AP ceases transmissions on the given channel when the AP switches to the at least one other channel.

18. In a wireless communication system including a plurality of basic service sets (BSSs), each BSS being capable of receiving signals from at least one neighboring BSS and including at least one wireless transmit/receiver unit (WTRU), an access point (AP) for processing data packets received by the AP, the packets originating from the AP's own BSS and the at least one neighboring BSS, the AP comprising:
   (a) a processor;
   (b) a measurement period (MP) interval timer coupled to the processor;
   (c) a promiscuous measurement period (PMP) timer coupled to the processor; and
   (d) a transceiver coupled to the processor, the transceiver including a receiver filter, wherein the processor:
      (i) sets an interval of the MP interval timer while the receiver filter is enabled such that the AP is restricted to processing only packets received on a given channel which originate from the AP's own BSS;
      (ii) sets a value of the PMP timer to a predetermined time duration when the MP interval timer expires and disables the receiver filter for the predetermined time duration such that the AP processes packets received on the given channel which originate from the AP's own BSS and the at least one neighboring BSS; and
      (iii) enables the receiver filter when the PMP timer expires.

19. The AP of claim 18 further comprising:
(e) a silent measurement period (SMP) timer, wherein the processor determines whether to trigger an SMP or a PMP, and if a determination is made to trigger an SMP, the processor:
(iv) resets the interval of the MP interval timer when the receiver filter is enabled when the PMP timer expires; and
(v) sets a value of the SMP timer to a predetermined time period and disabling the receiver filter for the predetermined time period when the MP interval timer expires.

20. The AP of claim 19 wherein the transceiver switches from the given channel to at least one other channel, and the AP processes all packets received on the other channel.

21. The AP of claim 20 wherein the AP determines an activity level of the other channel based on the packets received on the other channel and the transceiver switches from the other channel to the given channel when the SMP timer expires.

22. The AP of claim 18 wherein the interval of the MP interval timer comprises a fixed component and a variable component.

23. The AP of claim 19 wherein the result of the determination made by the processor alternates between triggering the SMP and triggering the PMP based on a periodicity constant.

24. The AP of claim 23 wherein if the periodicity constant is 2, then every other MP corresponds to an SMP.

25. The AP of claim 23 wherein if the periodicity constant is 2, then every other MP corresponds to a PMP.

26. The AP of claim 23 wherein the periodicity constant is set to 1 during a discovery phase of the AP such that every MP is provided as an SMP.

27. The AP of claim 18 wherein the AP further comprises:
(e) a packet information database, wherein the AP performs measurements and collects packet information on out-of-BSS packets received on the given channel, and the processor stores the packet information in the packet information database.

28. The AP of claim 27 wherein the stored packet information includes a received signal strength indication (RSSI) measurements of the out-of-BSS packets.

29. The AP of claim 28 wherein the RSSI measurements are used to determine the proximity of neighboring APs and WTRUs.

30. The AP of claim 27 wherein the stored packet information includes a number of packets received from individual nodes and packet durations.

31. The AP of claim 30 wherein the number of packets and packet durations are used to estimate the medium usage from neighboring APs and WTRUs operating on the given channel.

32. The AP of claim 27 wherein the packet information is collected from medium access control (MAC) header fields of the out-of-BSS packets and stored in a memory.

33. The AP of claim 32 wherein the packet information collected from MAC header fields identifies the BSS or WTRU from which the out-of-BSS packets originated from and the time at which the out-of-BSS packets were received.

34. The AP of claim 32 wherein the packet information collected from MAC header fields identifies the MAC address of at least one AP.

35. The AP of claim 32 wherein the packet information collected from MAC header fields identifies a destination address.

36. The AP of claim 20 wherein the transceiver ceases transmissions on the given channel when the transceiver switches to the at least one other channel.

37. In a wireless communication system including a plurality of basic service sets (BSSs), each BSS being capable of receiving signals from at least one neighboring BSS and including at least one wireless transmit/receiver unit (WTRU), an integrated circuit (IC) incorporated in an access point (AP) for processing data packets received by the AP, the packets originating from the AP's own BSS and the at least one neighboring BSS, the IC comprising:
(a) a processor;
(b) a measurement period (MP) interval timer coupled to the processor;
(c) a promiscuous measurement period (PMP) timer coupled to the processor; and
(d) a transceiver coupled to the processor, the transceiver including a receiver filter, wherein the processor:
(i) sets an interval of the MP interval timer while the receiver filter is enabled such that the AP is restricted to processing only packets received on a given channel which originate from the AP's own BSS;
(ii) sets a value of the PMP timer to a predetermined time duration when the MP interval timer expires and disables the receiver filter for the predetermined time duration such that the AP processes packets received on the given channel which originate from the AP's own BSS and the at least one neighboring BSS; and
(iii) enables the receiver filter when the PMP timer expires.

38. The IC of claim 37 further comprising:
(e) a silent measurement period (SMP) timer, wherein the processor determines whether to trigger an SMP or a PMP, and if a determination is made to trigger an SMP, the processor:
(iv) resets the interval of the MP interval timer when the receiver filter is enabled when the PMP timer expires; and
(v) sets a value of the SMP timer to a predetermined time period and disabling the receiver filter for the predetermined time period when the MP interval timer expires.

39. The IC of claim 38 wherein the transceiver switches from the given channel to at least one other channel, and the AP processes all packets received on the other channel.

40. The IC of claim 39 wherein the AP determines an activity level of the other channel based on the packets received on the other channel and the transceiver switches from the other channel to the given channel when the SMP timer expires.

41. The IC of claim 37 wherein the interval of the MP interval timer comprises a fixed component and a variable component.

42. The IC of claim 38 wherein the result of the determination made by the processor alternates between triggering the SMP and triggering the PMP based on a periodicity constant.

43. The IC of claim 42 wherein if the periodicity constant is 2, then every other MP corresponds to an SMP.

44. The IC of claim 42 wherein if the periodicity constant is 2, then every other MP corresponds to a PMP.

45. The IC of claim 42 wherein the periodicity constant is set to 1 during a discovery phase of the AP such that every MP is provided as an SMP.

46. The IC of claim 37 wherein the AP further comprises:
(e) a packet information database, wherein the AP performs measurements and collects packet information on out-of-BSS packets received on the given channel, and the processor stores the packet information in the packet information database.

47. The IC of claim 46 wherein the stored packet information includes a received signal strength indication (RSSI) measurements of the out-of-BSS packets.

48. The IC of claim 47 wherein the RSSI measurements are used to determine the proximity of neighboring APs and WTRUs.

49. The IC of claim 46 wherein the stored packet information includes a number of packets received from individual nodes and packet durations.

50. The IC of claim 49 wherein the number of packets and packet durations are used to estimate the medium usage from neighboring APs and WTRUs operating on the given channel.

51. The IC of claim 46 wherein the packet information is collected from medium access control (MAC) header fields of the out-of-BSS packets and stored in a memory.

52. The IC of claim 51 wherein the packet information collected from MAC header fields identifies the BSS or WTRU from which the out-of-BSS packets originated from and the time at which the out-of-BSS packets were received.

53. The IC of claim 51 wherein the packet information collected from MAC header fields identifies the MAC address of at least one AP.

54. The IC of claim 51 wherein the packet information collected from MAC header fields identifies a destination address.

55. The IC of claim 39 wherein the transceiver ceases transmissions on the given channel when the transceiver switches to the at least one other channel.

\* \* \* \* \*